United States Patent
Zeidner et al.

(10) Patent No.: US 10,508,864 B2
(45) Date of Patent: Dec. 17, 2019

(54) EVAPORATIVE COOLING IN ADDITIVE MANUFACTURED HEAT EXCHANGERS

(71) Applicant: Hamilton Sundstrand Corporation, Charlotte, NC (US)

(72) Inventors: Lawrence E. Zeidner, West Hartford, CT (US); Matthew Robert Pearson, Hartford, CT (US); Brian St. Rock, Andover, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/676,271

(22) Filed: Aug. 14, 2017

(65) Prior Publication Data

US 2019/0049187 A1  Feb. 14, 2019

(51) Int. Cl.

| F28D 5/00 | (2006.01) |
|---|---|
| F28F 27/02 | (2006.01) |
| B64D 13/08 | (2006.01) |
| F28D 9/00 | (2006.01) |
| F28D 21/00 | (2006.01) |
| B64D 13/06 | (2006.01) |
| B64D 41/00 | (2006.01) |
| F24F 3/147 | (2006.01) |
| F28F 25/06 | (2006.01) |
| F28F 3/08 | (2006.01) |

(52) U.S. Cl.
CPC ............. *F28D 5/00* (2013.01); *B64D 13/08* (2013.01); *F28D 9/0062* (2013.01); *F28D 21/0015* (2013.01); *F28F 3/08* (2013.01); *F28F 25/06* (2013.01); *F28F 27/02* (2013.01); *B64D 41/007* (2013.01); *B64D 2013/0648* (2013.01); *B64D 2013/0685* (2013.01); *F24F 3/147* (2013.01); *F28D 2021/004* (2013.01)

(58) Field of Classification Search
CPC ...... F28D 5/00; F28D 21/0015; F28D 9/0062; F28F 3/08; F28F 27/02; F28F 25/06
USPC ........................................................... 62/121
See application file for complete search history.

(56) References Cited

U.S. PATENT DOCUMENTS

| 5,461,882 A | 10/1995 | Zywiak |
| 5,902,692 A | 5/1999 | Batawi |
| 7,197,887 B2 * | 4/2007 | Maisotsenko ......... F24F 3/1411 62/121 |

(Continued)

FOREIGN PATENT DOCUMENTS

| EP | 2871433 A1 | 5/2015 |
| EP | 3378772 A1 | 9/2018 |
| WO | WO-2016125437 A1 * | 8/2016 ............... F25B 1/00 |

OTHER PUBLICATIONS

Extended European Search Report for EP Application No. 18188082.4, dated Nov. 19, 2018, 7 pages.

*Primary Examiner* — Ana M Vazquez
(74) *Attorney, Agent, or Firm* — Kinney & Lange, P.A.

(57) ABSTRACT

A heat exchanger includes a plate with an external surface, a channel, and a nozzle. The external surface bounds an interior of the plate. The channel is disposed in the heat exchanger and passes through a portion of the interior. The nozzle is integrally disposed in the heat exchanger, extends through a portion of the external surface, and is fluidly connected to the channel. The nozzle is configured to transport a liquid from the channel, through the external surface, and to distribute the liquid onto a portion of the heat exchanger.

5 Claims, 11 Drawing Sheets

(56) References Cited

U.S. PATENT DOCUMENTS

| | | |
|---|---|---|
| 7,748,211 B2 | 7/2010 | Norris et al. |
| 8,656,727 B2 | 2/2014 | Ullman et al. |
| 8,671,669 B2 * | 3/2014 | Holdenried ............... F01N 5/00 |
| | | 165/103 |
| 2010/0229586 A1 * | 9/2010 | Nicodem ................ F25B 39/04 |
| | | 62/305 |
| 2013/0152615 A1 * | 6/2013 | Lee ........................ H05K 7/207 |
| | | 62/241 |
| 2015/0052929 A1 | 2/2015 | Gillan et al. |
| 2015/0138723 A1 | 5/2015 | Shedd et al. |
| 2015/0208549 A1 | 7/2015 | Shedd et al. |
| 2016/0298662 A1 | 10/2016 | Taylor |
| 2016/0332724 A1 | 11/2016 | Mehring |
| 2017/0023311 A1 | 1/2017 | Urbanski |
| 2017/0183979 A1 * | 6/2017 | Joshi ....................... F01K 23/04 |
| 2018/0087848 A1 * | 3/2018 | Ogata ....................... F25B 1/00 |

* cited by examiner

EVAPORATIVE COOLING IN ADDITIVE MANUFACTURED HEAT EXCHANGERS

BACKGROUND

The present disclosure is directed generally to heat exchangers, and more specifically, to heat exchangers with evaporative-cooling enhancement.

In environmental control systems ("ECS's"), heat exchangers are used to cool air by transferring heat to another fluid (liquid or gaseous). In some existing ECS's, water is sprayed on the heat exchanger to increase cooling by adding evaporative cooling. The spraying of water is typically performed using spray nozzles external to the heat exchanger that partially block the airflow, and distribute the water in uneven and inconsistent spray patterns, coupling the water's path through the heat exchanger to the air flow path, leading to non-adjustable water impingement and inefficient evaporative cooling properties. These external spray nozzles couple the water's delivery to the air flow path, which is not optimal to target the water to specific hotspots in the heat exchanger.

SUMMARY

A heat exchanger includes a plate with an external surface, a channel, and a nozzle. The external surface bounds an interior of the plate. The channel is disposed in the heat exchanger and passes through a portion of the interior. The nozzle is integrally disposed in the heat exchanger, extends through a portion of the external surface, and is fluidly connected to the channel. The nozzle is configured to transport a liquid from the channel, through the external surface, and to distribute the liquid onto a portion of the heat exchanger.

A method of manufacturing includes creating an electronic file defining a heat exchanger in layers and building the heat exchanger with an additive manufacturing process in which the heat exchanger is built layer-by-layer by depositing powder and selectively solidifying the powder in accordance with the electronic file. The heat exchanger includes a plate with an external surface, a channel, and a nozzle. The external surface bounds an interior of the plate. The channel is disposed in the heat exchanger and passes through a portion of the interior. The nozzle is integrally disposed in the heat exchanger, extends through a portion of the external surface, and is fluidly connected to the channel. The nozzle is configured to transport a liquid from the channel, through the external surface, and to distribute the liquid onto a portion of the heat exchanger.

A method of evaporative cooling in an environmental control system includes forcing a liquid into a channel disposed within a portion of a heat exchanger. The liquid is transported through the channel. The liquid is delivered to a nozzle that is integrally formed with and disposed in the heat exchanger and that is fluidly connected to the channel. The liquid is ejected from the nozzle and is distributed onto an external surface of the heat exchanger. The liquid is evaporated into passing cooling air.

DETAILED DESCRIPTION

The disclosed heat exchanger includes channels additively manufactured into the material of the heat exchanger that distribute and introduce cooling liquid (e.g., water) at locations within the heat exchanger to provide optimal evaporative cooling and using minimal water. The channels are designed into the heat exchanger geometry to optimally balance water delivery based on local conditions within the heat exchanger. The channels deliver water to surfaces of the heat exchanger that are typically inaccessible to conventional external spray nozzles. Additive manufacturing of fluidic valves within the channels enables the channels to be tolerant to variations in water pressure and flow rate supplied to an input port of the channel network. In addition, spray nozzles are additively manufactured into the heat exchanger enabling fine tuning of positioning, quantity, and geometric design of the nozzles in order to adjust impingement of water onto heat exchanger surfaces to maximize evaporative cooling. Additive manufacturing of the heat exchanger enables the introduction of extra geometric features without additional parts, interfaces, and fasteners required by existing designs.

Figure 1:
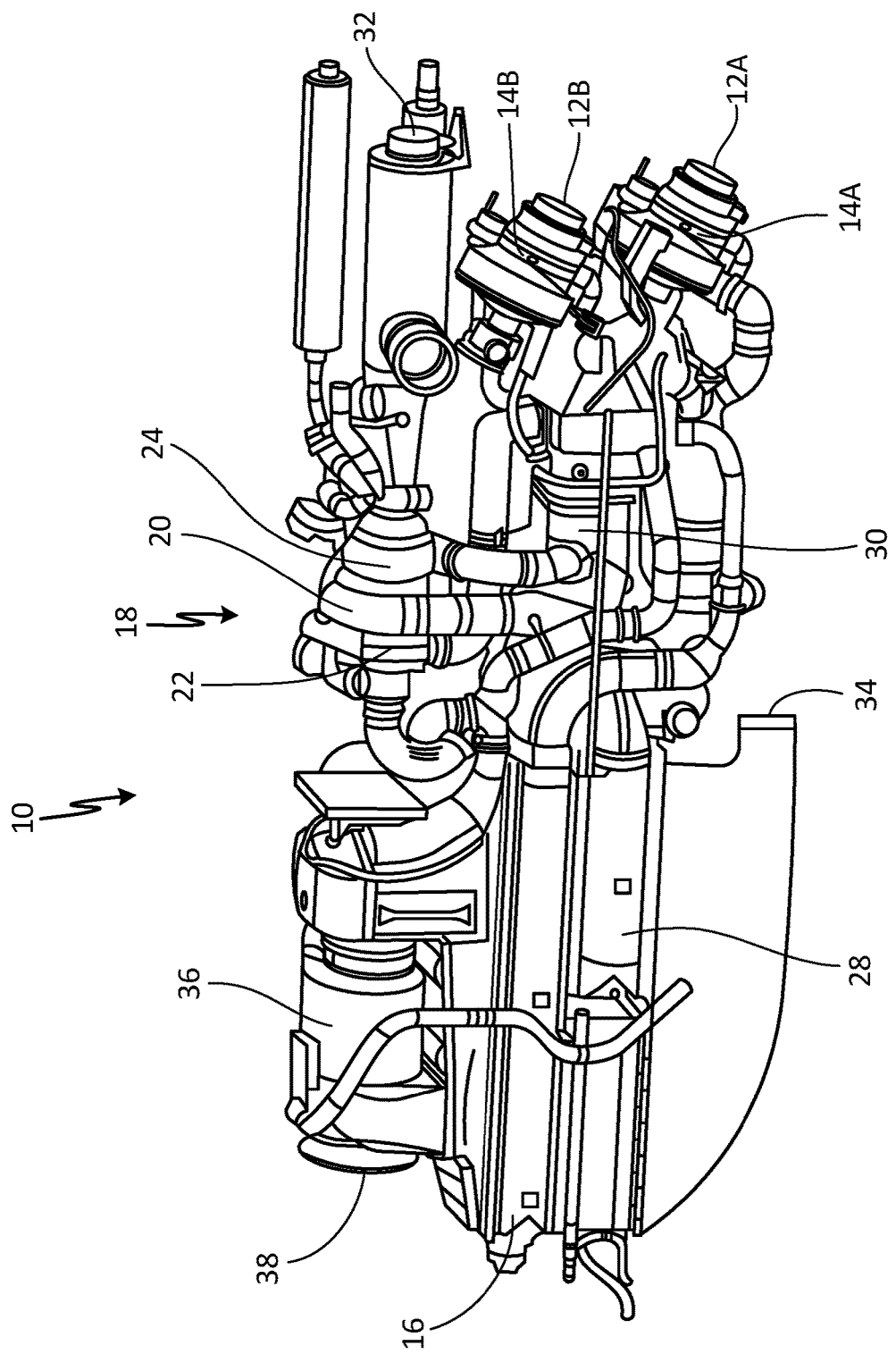
FIG. 1 is a perspective view of an ECS.

FIG. 1 is a perspective view of environmental control system ("ECS") 10 with inlets 12A and 12B, air compressors 14A and 14B, first heat exchanger 16, air cycle machine 18, compressor 20, first turbine 22, second turbine 24, shaft 26, secondary heat exchanger 28, condenser 30, outlet 32, ram air inlet 34, ram air fan 36, and ram air outlet 38. ECS 10 is an example of an ECS with which first and second heat exchangers 16 and 28 can be incorporated. In other non-limiting embodiments, ECS 10 can include other types of ECS's with different configurations and/or elements, as well being configured to connect to industrial, aircraft, or other types of engine systems requiring thermal transfer management. In this non-limiting embodiment, ECS 10 is discussed below as being incorporated into an aircraft.

Inlets 12A and 12B are connected to air compressors 14A and 14B, respectively. Air compressors 14A and 14B are connected to an ozone converter (not shown) with a duct. First heat exchanger 16 is connected to air cycle machine 18 with a duct. Air cycle machine 18 includes compressor 20, first turbine 22, and second turbine 24 mounted on shaft 26. Air cycle machine 18 is connected to secondary heat exchanger 28, and condenser 30 with ducts. Air cycle machine 18 is further connected to outlet 32 with a duct. Ram air inlet 34 is connected to ram air fan 36 that is connected to ram air outlet 38.

ECS 10 can be mounted to a pressure vessel of an aircraft and works to supply conditioned air to the aircraft cabin at the proper temperature and pressure. Ambient air is ingested through an opening on the aircraft and travels through a duct (not shown) to inlets 12A and 12B and to ram air inlet 34. The air that flows through ram air inlet 34 is drawn across first heat exchanger 16 and secondary heat exchanger 28 with ram air fan 36. The air flow from ram air inlet 34 to ram air outlet 38 provides cooling. Ram air fan 36 operates to produce this air flow if the flow of ram air due to the aircraft's own movement is insufficient (for example, when the aircraft is sitting on the ground). The used ram air is then dumped overboard through ram air outlet 38.

The air that flows through inlets 12A and 12B flows into air compressors 14A and 14B, respectively. Air compressors 14A and 14B include a motor and a compressor to compress ambient air. The compressed air then flows through the ozone converter (not shown) to first heat exchanger 16. First heat exchanger 16 cools the compressed air using the cooling airflow from ram air fan 36. The cooled air then flows to air cycle machine 18. Air cycle machine 18 includes compressor 20, first turbine 22, and second turbine 24 that are all mounted to shaft 26. The cooled air from first heat exchanger 16 first flows through compressor 20 of air cycle machine 18. Compressor 20 includes a compressor rotor mounted to shaft 26 that is rotated with shaft 26 to further compress the air flowing through compressor 20 of air cycle machine 18. The compressed air from compressor 20 then flows to secondary heat exchanger 28 where it is further cooled with ram air that is pulled across secondary heat exchanger 28 with ram air fan 36.

The cooled air from secondary heat exchanger 28 then flows through a duct to condenser 30. Condenser 30 condenses the cooled air by lowering the air temperature. The condensed air then flows through a duct to a water extractor (not shown), which collects the condensed water out of the air. The air then flows from the water extractor through first turbine 22 of air cycle machine 18. First turbine 22 also includes a first turbine rotor mounted on shaft 26. Energy is extracted from the air expanding through first turbine 22 of air cycle machine 18 to drive shaft 26.

Air from first turbine 22 then flows back through condenser 30. Air from condenser 30 then flows through second turbine 24 of air cycle machine 18. Second turbine 24 also includes a second turbine rotor mounted on shaft 26. Energy is extracted from the air expanding through second turbine 24 of air cycle machine 18 to drive shaft 26. Air from second turbine 24 then flows through outlet 32 to be delivered to the aircraft cabin.

An additional, non-limiting example of an ECS pack is disclosed in U.S. patent application Ser. No. 15/136,533 filed Apr. 22, 2016, entitled ENVIRONMENTAL CONTROL SYSTEM UTILIZING CABIN AIR TO DRIVE A POWER TURBINE OF AN AIR CYCLE MACHINE AND UTILIZING MULTIPLE MIX POINTS FOR RECIRCULATION AIR IN ACCORDANCE WITH PRESSURE MODE and published as U.S. Patent Application Publication No. 2016/0231031A1, which is herein incorporated by reference in its entirety.

Figure 2:
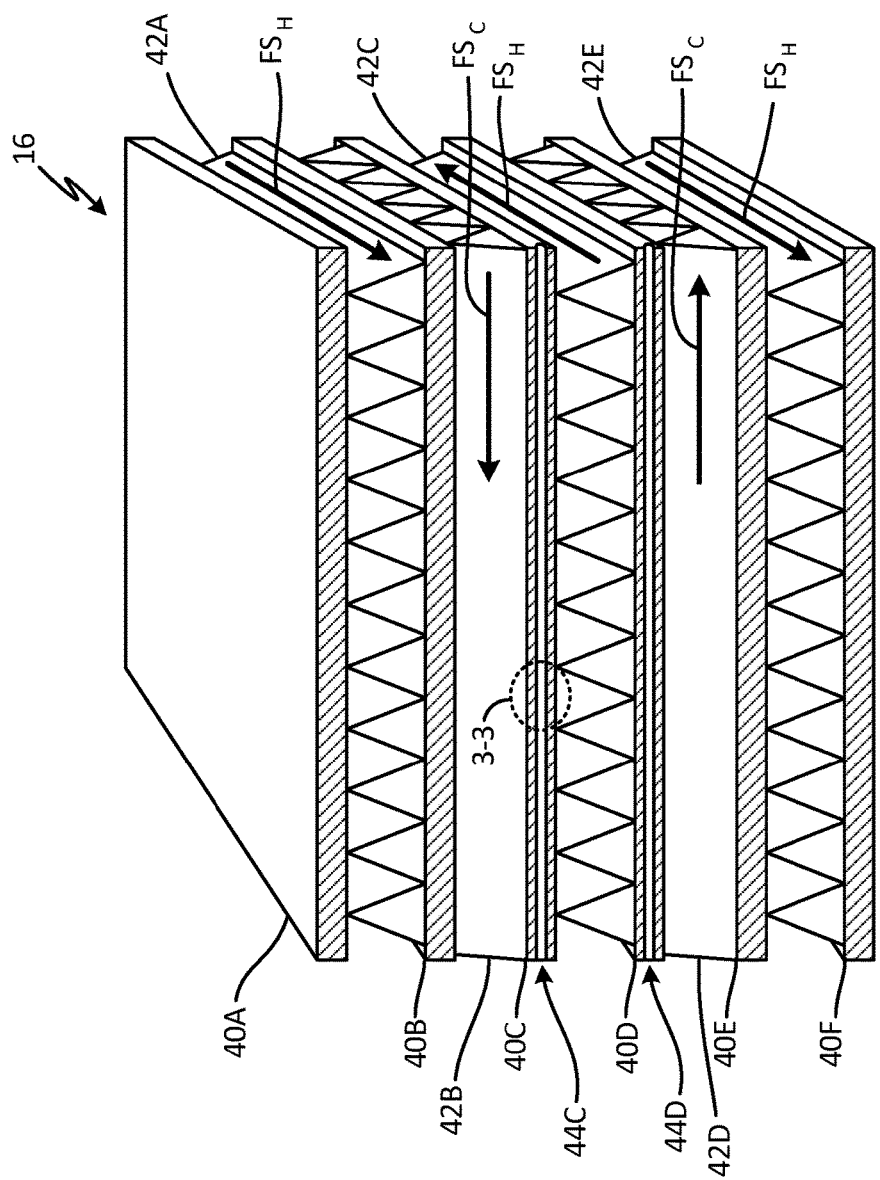
FIG. 2 is an enlarged perspective cross-sectional view of a heat exchanger of the ECS.

FIG. 2 is an enlarged perspective cross-sectional view of a portion of first heat exchanger 16 of ECS 10, with first heat exchanger 16 shown to include plates 40A, 40B, 40C, 40D, 40E, and 40F, fins 42A, 42B, 42C, 42D, and 42E, channels 44C and 44D, cold flow stream $FS_C$, and hot flow stream $FS_H$. FIGS. 2-8 include discussion of first heat exchanger 16, however the same or similar discussion of elements can also apply to second heat exchanger 28, or any other heat exchanger, of ECS 10.

First heat exchanger 16 is designed for and built by a layer-by-layer additive manufacturing process. In one non-limiting embodiment, first heat exchanger 16 can be formed with an additive manufacturing process including at least one of direct metal laser sintering, selective metal laser sintering, injection molding, and/or stereolithography. In one non-limiting embodiment, a material of first heat exchanger 16 can be a metal or polymer material including thermodynamic characteristics suitable for use with specific or general applications for ECS 10.

Plates 40A, 40B, 40C, 40D, 40E, and 40F are layers of solid material. In some non-limiting embodiments, a material of plates 40A, 40B, 40C, 40D, 40E, and/or 40F can be a metal or polymer material including thermodynamic characteristics suitable for use with specific or general applications for ECS 10. As will be discussed, plates 40A, 40B, 40C, 40D, 40E, and 40F, as well as all or some portions of first heat exchanger 16, can be manufactured with an additive manufacturing process in which first heat exchanger 16 is built layer-by-layer by depositing powder and selectively solidifying the powder in accordance with an electronic file.

Fins 42A, 42B, 42C, 42D, and 42E are elongated sheets of solid material with distinct thermal dynamic transfer characteristics. In one non-limiting embodiment, a material of fins 42A, 42B, 42C, 42D, and/or 42E can be the same or different metal or polymer material as plates 40A, 40B, 40C, 40D, 40E, and/or 40F, and can be selected based upon thermodynamic characteristics suitable for use with specific or general applications for ECS 10.

Channels 44C and 44D are passages configured for the transfer of a liquid such as water. In one non limiting embodiment, channels 44C and 44D can be evaporative-cooling fluid channels. In one non-limiting embodiment, channels 44C and 44D include a circular cross-section, but can also include other cross-sectional shapes with uniform or varying dimensions along a length of channels 44C and 44D. In one non-limiting embodiment, channels 44C and 44D can range in size with diameters of 0.5 millimeter (0.020 inches) to 2.0 millimeters (0.079 inches). In other non-limiting embodiments, channels 44C and 44D can range in size with diameters of 0.1 millimeter (0.004 inches) to 10.0 millimeters (0.39 inches). Cold flow stream $FS_C$ is a stream of air with a temperature less than hot flow stream $FS_H$. Hot flow stream $FS_H$ is a stream of air with a temperature greater than cold flow stream $FS_C$.

Heat exchanger 16 is configured to connect to ECS 10, which in this non-limiting embodiment is an ECS of an aircraft. Plates 40A, 40B, 40C, 40D, 40E, and 40F are positioned sequentially positioned and spaced apart from one another. In one non-limiting embodiment, plates 40A, 40B, 40C, 40D, 40E, and 40F are equally spaced from one another. Plates 40A and 40B are connected to fins 42A on opposing sides of fins 42A. Fins 42A are connected to and extend between plates 40A and 40B. Plates 40B and 40C are connected to fins 42B on opposing sides of fins 42B. Fins 42B are connected to and extend between plates 40B and 40C. Plates 40C and 40D are connected to fins 42C on opposing sides of fins 42C. Fins 42C are connected to and extend between plates 40C and 40D. Plates 40D and 40E are connected to fins 42D on opposing sides of fins 42D. Fins 42D are connected to and extend between plates 40D and 40E. Plates 40E and 40F are connected to fins 42E on opposing sides of fins 42E. Fins 42E are connected to and extend between plates 40E and 40F. In one non-limiting embodiment, fins 42A, 42B, 42C, 42D, and 42E can be formed concurrently with plates 40A, 40B, 40C, 40D, 40E, and 40F during the additive manufacturing process of forming heat exchanger 16.

Channels 44C and 44D are disposed in and pass through portions of plates 40C and 40D, respectively. In one non-limiting embodiment, channels 44C and 44D can be fluidly connected to a source of cooling liquid (e.g., water) in an engine or a water separator of air cycle machine 18. Channels 44C and 44D are formed concurrently with plates 40C and 40D during the additive manufacturing process used to build heat exchanger 16.

Cold flow stream $FS_C$ is a flow of cooling air that passes across and is in fluid communication with some of plates 40A, 40B, 40C, 40D, 40E, and 40F. In one non-limiting embodiment, cold flow stream $FS_C$ passes between and is in fluid communication with plates 40B and 40C and plates 40D and 40E. In this non-limiting embodiment, cold flow stream $FS_C$ also passes across and is in fluid communication with fins 42B and 42D. Hot flow stream $FS_H$ is a flow of warm air that passes across and is in fluid communication with some of plates 40A, 40B, 40C, 40D, 40E, and 40F. In one non-limiting embodiment, hot flow stream $FS_H$ passes between and is in fluid communication with plates 40A and 40B, plates 40C and 40D, and plates 40E and 40F. In this non-limiting embodiment, hot flow stream $FS_H$ also passes across and is in fluid communication with fins 42A, 42C, and 42E. In one non-limiting embodiment, hot flow stream $FS_H$ can come from a hot air source that ECS 10 is fluidly connected to such as a source of bleed air in an aircraft engine.

During operation of ECS 10, hot flow stream $FS_H$ is forced into first heat exchanger 16 and across fins 42A, 42C, and 42E as well as plates 40A, 40B, 40C, 40D, 40E, and 40F. As hot flow stream $FS_H$ is forced or drawn across plates 40A, 40B, 40C, 40D, 40E, and 40F, thermal energy is transferred from hot flow stream $FS_H$ into plates 40A, 40B, 40C, 40D, 40E, and 40F and into fins 42A, 42C, and 42E via conductive heat transfer. Cold flow stream $FS_C$ is also forced into first heat exchanger 16 and across fins 42B and 42D as well as plates 40B, 40C, 40E, and 40F. As cold flow stream $FS_C$ is forced or drawn across plates 40B, 40C, 40E, and 40F, thermal energy is transferred from plates 40B, 40C, 40D, and 40E and from fins 42B and 42D into cold flow stream $FS_C$ via conductive heat transfer.

Channels 44C and 44D transport a cooling liquid (e.g., water) through plates 40C and 40D, respectively. As water is transported through channels 44C and 44D, thermal energy is transferred from plates 40C and 40D into the water via conductive heat transfer. As will be discusses with respect to FIGS. 3-7, the water in channels 44C and 44D is ejected from channels 44C and 44D via nozzles and is then distributed onto at least one of plates 40A, 40B, 40C, 40D, 40E, and 40F to provide the function of evaporative cooling to further draw thermal energy from 40A, 40B, 40C, 40D, 40E, and 40F thereby cooling heat exchanger 16. In other non-limiting embodiments, channels 44C and 44D can distribute the cooling liquid throughout heat exchanger 16 in addition to plates 40A, 40B, 40C, 40D, 40E, and 40F.

Because channels 44C and 44D are additively manufactured into plates 40A, 40B, 40C, 40D, 40E, and 40F, the geometry of channels 44C and 44D can be designed with a higher degree of precision than conventional subtractive manufacturing methods so as to distribute and introduce water at locations within heat exchanger 16 to provide optimal evaporative cooling and minimal water usage.

Figure 6A:
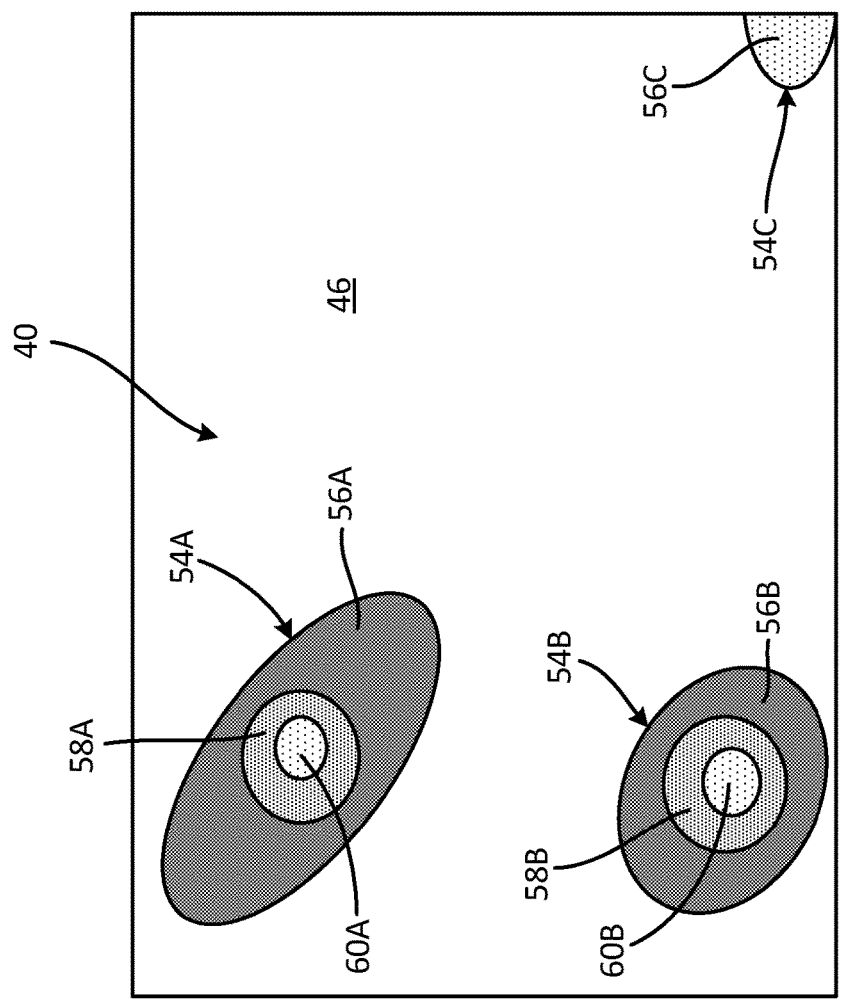
FIG. 6A is a representation of a heat map of a portion of the heat exchanger.
Figure 6B:
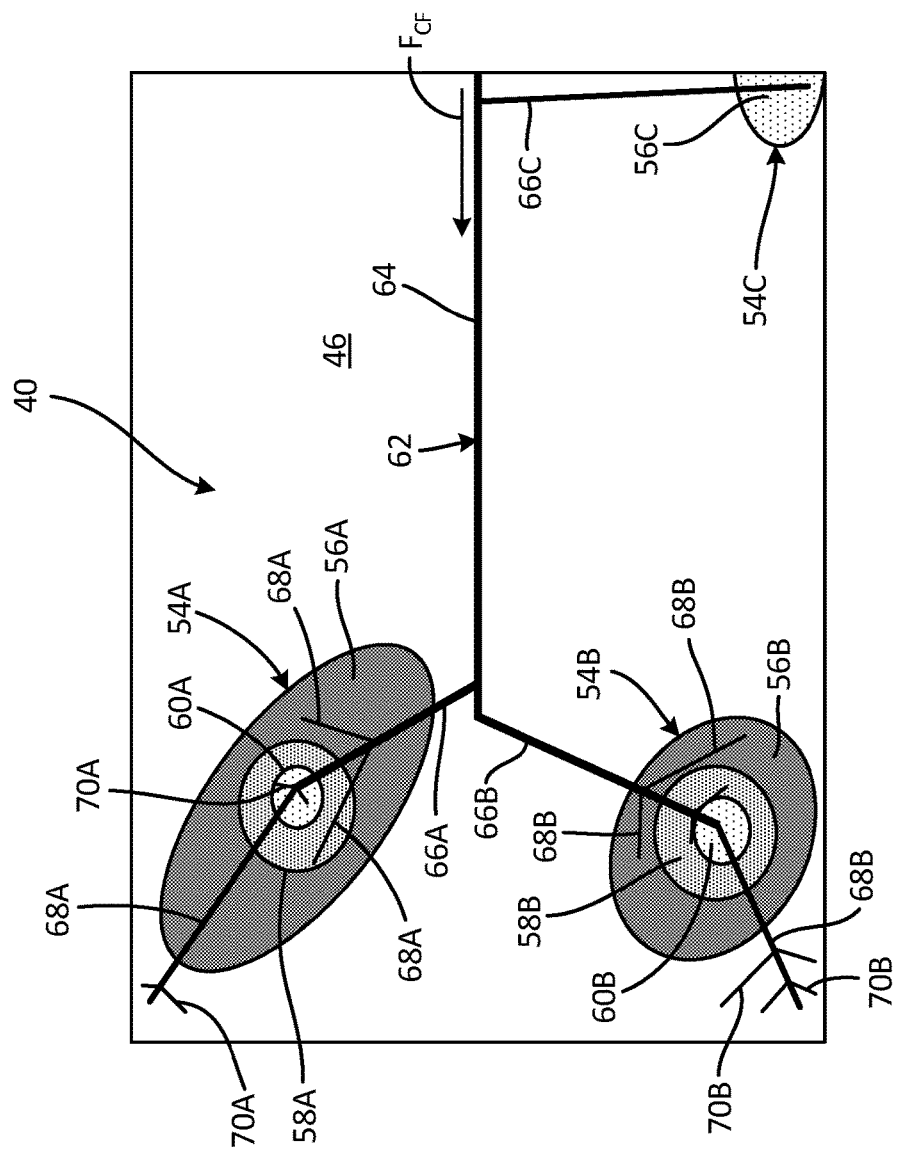
FIG. 6B is a representation of a heat map of the portion of the heat exchanger showing a channel manifold.

Channels 44C and 44D are designed into the geometry of heat exchanger 16 to optimally balance water delivery based on the local conditions within heat exchanger 16 (see also discussion of FIGS. 6A and 6B). Channels 44C and 44D provide the benefit of being able to deliver water uniformly, optimally, and to precise locations of heat exchanger 16 as compared to existing evaporative cooling methods and systems that include distributing water onto the heat exchanger via spray apparatuses (e.g., nozzles) located externally to the heat exchanger. In another non-limiting embodiment, spray nozzles would likely be upstream of heat exchanger 28 (where there is space for installation), so heat exchanger 16 might not see much benefit. Channels 44C and 44D allow for addition of evaporative cooling to heat exchanger 16 in a space-constrained environment, which is particularly useful if heat exchanger 16 requires evaporative cooling to perform as-desired while heat exchanger 28 does not need evaporative cooling to perform as-desired.

In another non-limiting embodiment, heat exchanger 16 or 28 can include a plate with one surface in contact with both a hot-fluid channel and a cold-fluid channel, and a network of internal evaporative-cooling fluid channels with local terminations at nozzles on the plate's cold-fluid channel surface. The hot-fluid channel and cold-fluid channel can both disposed in the heat exchanger so they both pass through the heat exchanger from their respective inlets to outlets. The nozzles can be integrally disposed in the heat exchanger, extending through a portion of the plate surface, connecting the evaporative-cooling fluid channel with the cold-fluid channel. The nozzle can be configured to transport a liquid from the evaporative-cooling fluid channel, through the plate's surface, and to distribute the liquid onto a portion of the plate's cold-side surface and/or within the cold-side fluid flow.

Figure 3:
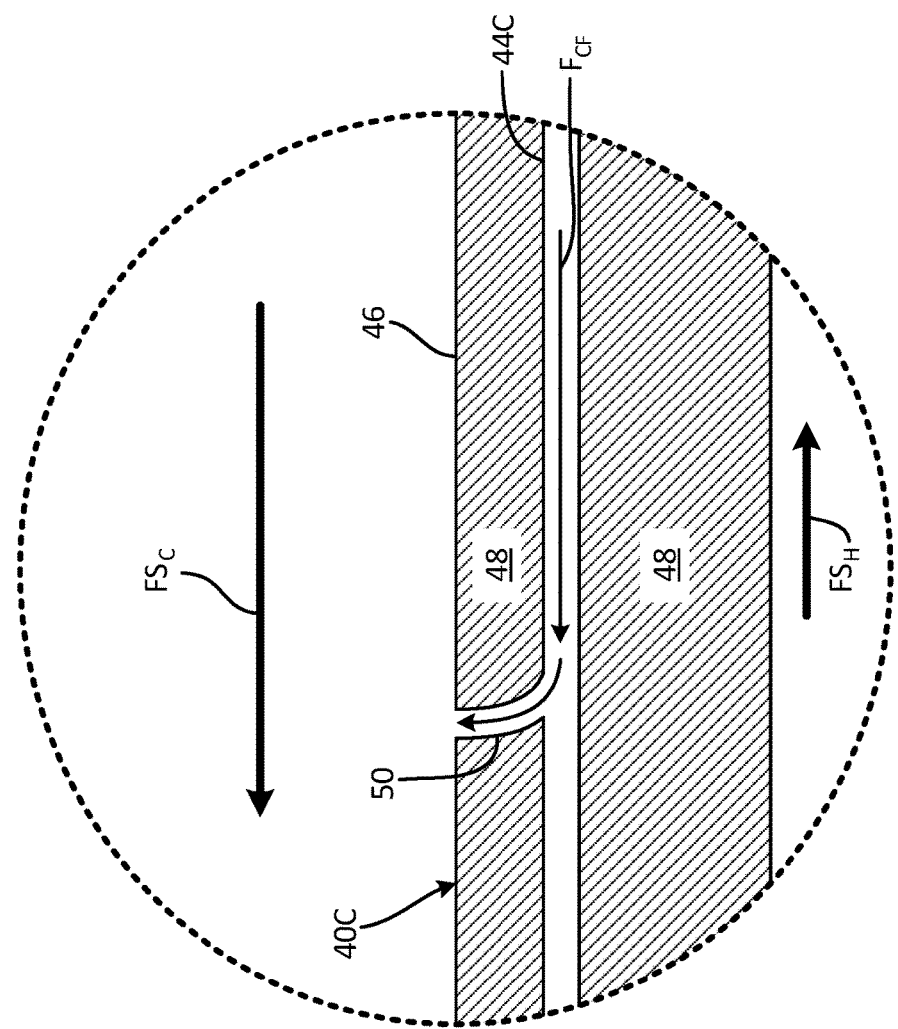
FIG. 3 is an enlarged cross-section view of 3-3 from FIG. 2 showing a first portion of the heat exchanger.

FIG. 3 shows an enlarged cross-section view of section 3-3 from FIG. 2 showing a portion of plate 40C with channel 44C, external surface 46, nozzle 50, cooling fluid flow $F_{CF}$, cold flow stream $FS_C$, and hot flow stream $FS_H$. Although FIGS. 3-7 specifically refer to plate 40C, the discussion plate 40C in FIGS. 3-7 can also apply to any of plates 40A, 40B, 40C, 40D, 40E, and 40F of heat exchanger 16.

External surface 46 is an exterior layer of plate 40C. Interior 48 is a portion of plate 40C including solid material. Nozzle 50 is an aperture or gap configured for the transfer or ejection of a liquid. Nozzle 50 is shown to include a shape with a uniform cross-sectional area as nozzle 50 extends from channel 44C to external surface 46. In one non-limiting embodiment, the cross-sectional shape of nozzle 50 can include a circle or other geometric shapes (see FIG. 7 for additional non-limiting examples). Cooling fluid flow $F_{CF}$ is a flow of a cooling liquid such as water.

External surface 46 completely bounds an entirety of interior 48 of plate 40C. Interior 48 contains channel 44C such that channel 44C is formed in interior 48. Nozzle 50 is integrally disposed in plate 40C. Nozzle 50 extends through a portion of external surface 46 and is fluidly connected to channel 44C. Nozzle 50 is configured to transport cooling fluid flow $F_{CF}$ (i.e., a liquid) from channel 44C, through external surface 46, and distribute cooling fluid flow $F_{CF}$ onto a portion of external surface 46 of plate 40C of heat exchanger 16. In other non-limiting embodiments, nozzle 50 can be disposed in some or all of plates 40A, 40B, 40C, 40D, 40E, and/or 40F and in fins 42A, 42B, 42C, 42D, and/or 42E. Cooling fluid flow $F_{CF}$ is disposed in channel 44C and is in fluid communication with channel 44C and nozzle 50. Cooling fluid flow $F_{CF}$ originates from and is in fluid connection with a source of cooling liquid (e.g., water) in the engine.

During operation of ECS 10, cooling fluid flow $F_{CF}$ is forced into and transported through channel 44C. Cooling fluid flow $F_{CF}$ is delivered to and is ejected from nozzle 50. Cooling fluid flow $F_{CF}$ that is ejected from nozzle 50 is deposited onto external surface 46 of plate 40C. Thermal energy is transferred from external surface 46 of plate 40C to cooling fluid flow $F_{CF}$ deposited onto external surface 46 such that cooling fluid flow $F_{CF}$ is then evaporated into cold flow stream $FS_C$ passing across plate 40C. As cooling fluid flow $F_{CF}$ is evaporated, an amount of thermal energy required for cold flow stream $FS_C$ to phase change into a gas is removed from plate 40C and transferred to cooling fluid flow $F_{CF}$ thereby causing a cooling effect of heat exchanger 16. A more detailed example of evaporative cooling can be found in U.S. Pat. No. 7,748,211B2.

Nozzle 50 is designed into the geometry of heat exchanger 16 to optimally balance water delivery based on the local conditions within heat exchanger 16 (see also discussion of FIGS. 6A and 6B). Nozzle 50 provides the benefit of being able to deliver water to precise locations on plate 40C of heat exchanger 16 as compared to existing evaporative cooling methods and systems that include distributing water onto the heat exchanger plates via spray apparatuses located externally to the heat exchanger. Additionally, nozzle 50 can deliver cooling fluid flow $F_{CF}$ to locations of plate 40C that are typically inaccessible to conventional spray nozzles disposed externally to the heat exchanger. Channel 44C and with nozzle 50 allow for locally optimizing the flow of water to different locations within heat exchanger 16 to provide evaporative cooling without the cost, complexity, or maintenance issues related to conventionally separate nozzles and fasteners.

Figure 4:
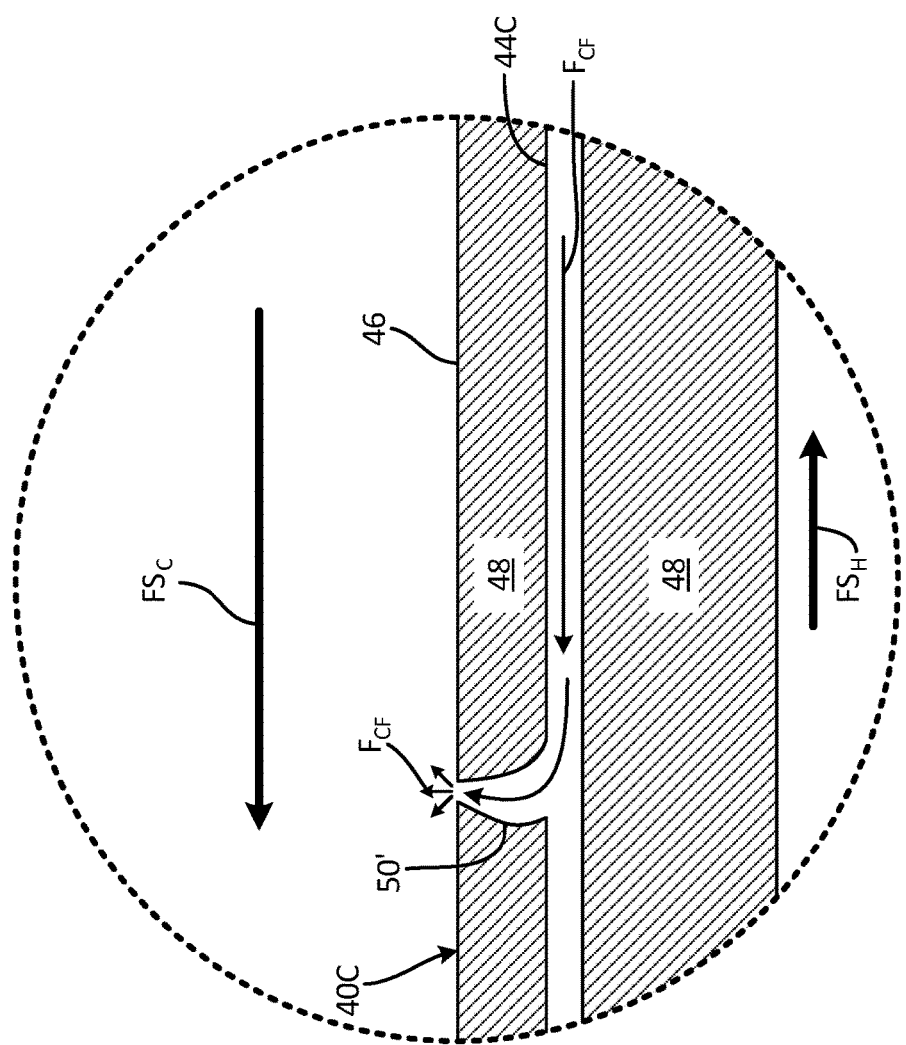
FIG. 4 is a cross-section view of a second portion of the heat exchanger.

FIG. 4 shows a second enlarged cross-section view of section 3-3 from FIG. 2 showing a portion of plate 40C with channel 44C, external surface 46, interior 48, nozzle 50', cooling fluid flow $F_{CF}$, cold flow stream $FS_C$, and hot flow stream $FS_H$. FIG. 4 differs from FIG. 3 in that nozzle 50' includes a different shape than nozzle 50 in FIG. 3.

Nozzle 50' is shown to include a shape with a cross-sectional area that reduces in size as nozzle 50' extends out from channel 44C towards external surface 46. This configuration of nozzle 50' creates a spout, or conically shaped void, through which cooling fluid flow $F_{CF}$ is transported and ejected from. The effect of the constricting shape of nozzle 50' is to increase the speed of flow of cooling fluid flow $F_{CF}$ as cooling fluid flow $F_{CF}$ flows from channel 44C towards external surface 46 as a result of the Bernoulli Principle and the Venturi Effect. In one non-limiting embodiment, the shape of nozzle 50' can be configured to provide specific ejection and distribution/impingement patterns of cooling fluid flow $F_{CF}$ onto external surface 46 of plate 40C in order to adjust and fine-tune the effects of evaporative cooling.

In one non-limiting embodiment, the shape of nozzle 50' can be configured to provide specific ejection and distribution/impingement patterns of cooling fluid flow $F_{CF}$ onto external surface 46 of plate 40C in order to adjust and fine-tune the effects of evaporative cooling.

Figure 5:
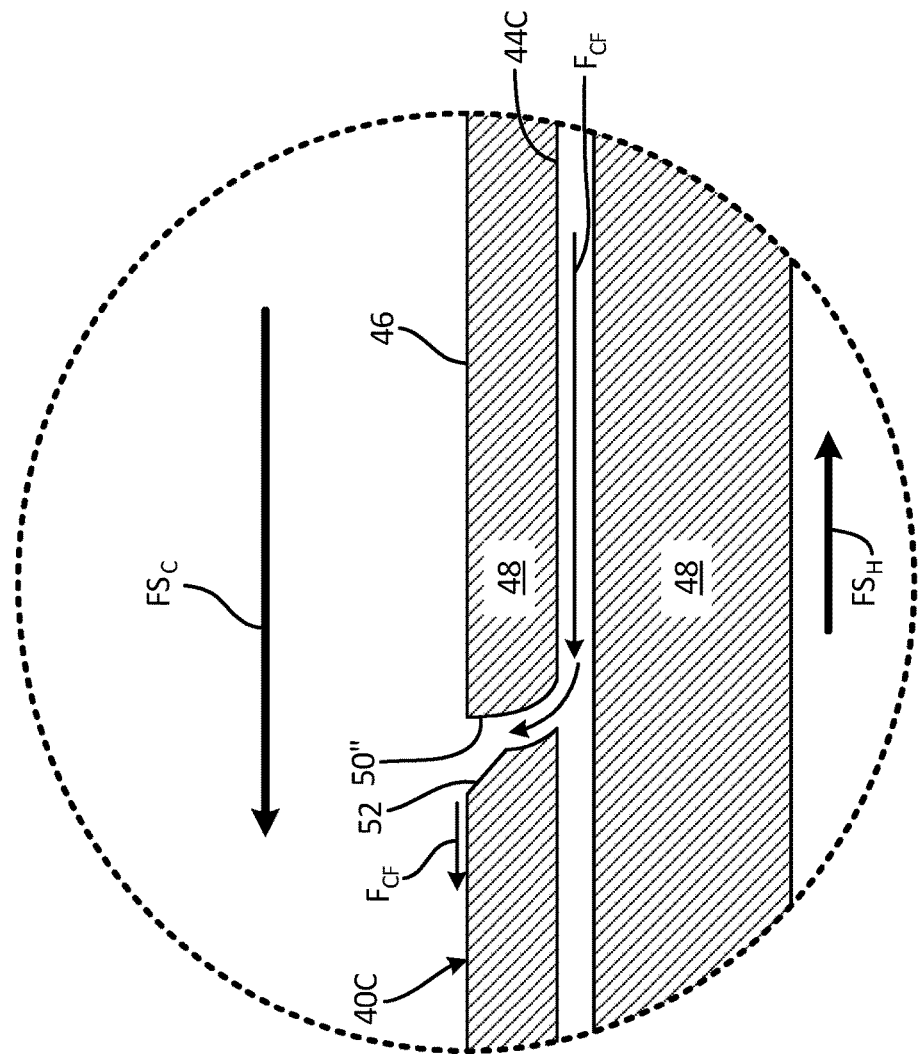
FIG. 5 is a cross-section view of a third portion of the heat exchanger.

FIG. 5 shows a second enlarged cross-section view of section 3-3 from FIG. 2 showing a portion of plate 40C with channel 44C, external surface 46, interior 48, nozzle 50" with chamfer 52, cooling fluid flow $F_{CF}$, cold flow stream $FS_C$, and hot flow stream $FS_H$. FIG. 5 differs from FIGS. 3 and 4 in that nozzle 50" with chamfer 52 includes a different shape than nozzles 50 and 50' shown in FIG. 3 and FIG. 4, respectively.

Nozzle 50" is an aperture or gap configured for the transfer or ejection of a liquid. Chamfer 52 is a cut-out in plate 40C that creates a sloping surface a portion of nozzle 50". Nozzle 50" with chamfer 52 is shown to include a shape with a cross-sectional area that increases in size as nozzle 50" extends out from channel 44C towards external surface 46. This configuration of nozzle 50" with chamfer 52 creates a spout, or conically shaped void (oppositely oriented from nozzle 50' shown in FIG. 4), through which cooling fluid flow $F_{CF}$ is transported and ejected from. The effect of the constricting shape of nozzle 50" with chamfer 52 is to decrease the speed of flow of cooling fluid flow $F_{CF}$ as cooling fluid flow $F_{CF}$ flows from channel 44C towards external surface 46 as a result of the Bernoulli Principle and the Venturi Effect. This decrease in speed causes cooling fluid flow $F_{CF}$ to eject from nozzle 50" at a slower speed than from nozzle 50 and 50', which results in cooling fluid flow $F_{CF}$ remaining along the surface of external surface 46 as cooling fluid flow $F_{CF}$ is transferred from chamfer 52 of nozzle 50" to external surface 46.

This is different than the ejection of cooling fluid flow $F_{CF}$ from nozzle 50' shown in FIG. 4 in that cooling fluid flow $F_{CF}$ ejected from nozzle 50' is discharged from nozzle 50' and into the surrounding air and is then deposited onto external surface 46 on plate 40C. Here, cooling fluid flow $F_{CF}$ ejected from nozzle 50" remains on plate 40C for a longer period of time allowing for an increased transfer of thermal energy from plate 40C to cooling fluid flow $F_{CF}$ and greater control of placement of cooling fluid flow $F_{CF}$ along external surface 46 of plate 40C. Ejection of cooling fluid flow $F_{CF}$ out of nozzle 50" onto external surface 46 creates a liquid film cooling effect that can be combined with the evaporative cooling effects discussed with respect to FIGS. 3 and 4.

FIG. 6A shows a map of temperature distribution along a portion of plate 40 including interior 48, hot spots 54A (with first temperature zone 56A, second temperature zone 58A, and third temperature zone 60A), 54B (with first temperature zone 56B, second temperature zone 58B, and third temperature zone 60B), 54C (with first temperature zone 56C), and cooling fluid flow $F_{CF}$. FIG. B shows the elements included in FIG. 6A and channel manifold 62 with primary channel 64, secondary channels 66A, 66B, and 66C, tertiary channels 68A and 68B, and quaternary channels 70A and 70B. FIGS. 6A and 6B are substantially similar and will thus be discussed in unison. Plate 40 in FIGS. 6A and 6B are representative of any of plates 40A, 40B, 40C, 40D, 40E, and 40F of heat exchanger 16. FIGS. 6A and 6B are representative of non-limiting embodiments and are illustrative in nature. In other non-limiting embodiments, the temperature distribution in the heat exchanger can be less varied, and instead of localized hot spots, an end of the heat exchanger can be hotter than another end. But even in such a case, customization of the flow of liquid as described herein is useful.

In one non-limiting embodiment, FIGS. 6A and 6B can include map of temperature distribution along a portion of plate 40. In another non-limiting embodiment, FIGS. 6A and 6B can be a temperature profile representative of localized amounts of at least one of temperature and heat flux along plate 40 of heat exchanger 16.

Hot spots 54A, 54B, and 54C are regions of plate 40 that include a localized difference in temperature than other portions of plate 40. First temperature zones 56A, 56B, and 56C are regions or areas of hot spots 54A, 54B, and 54C, respectively with a first temperature. Second temperature zones 58A and 58B are regions or areas of hot spots 54A and 54B, respectively with a second temperature. Third temperature zones 60A and 60B are regions or areas of hot spots 54A and 54B, respectively with a third temperature. Channel manifold 62 is an assembly of several channels that can be of uniform or various shape and/or sizes.

Primary channel 64, secondary channels 66A, 66B, and 66C, tertiary channels 68A and 68B, and quaternary channels 70A and 70B are passages configured for the transfer of a liquid such as water. In one non-limiting embodiment, primary channel 64, secondary channels 66A, 66B, and 66C, tertiary channels 68A and 68B, and quaternary channels 70A and 70B include a circular cross-section, but can also include other cross-sectional shapes with uniform or varying dimensions along a length of any of primary channel 64, secondary channels 66A, 66B, and 66C, tertiary channels 68A and 68B, and quaternary channels 70A and 70B.

Hot spots 54A, 54B, and 54C are representative of portions or regions disposed on the surface of plate 40. First temperature zones 56A, 56B, and 56C are contained within boundaries of hot spots 54A, 54B, and 54C, respectively. First temperature zones 56A, 56B, and 56C include temperatures (or temperature) that are greater than portions of plate 40 that are not covered by hot spots 54A, 54B, and 54C. The temperatures (or temperature) of first temperature zones 56A and 56B are less than second temperature zones 58A and 58B, respectively.

Second temperature zones 58A and 58B are located within first temperature zones 56A and 56B, respectively and include temperatures (or temperature) that are greater than first temperature zones 56A and 56B, respectively. The temperatures (or temperature) of second temperature zones 58A and 58B are less than third temperature zones 60A and 60B, respectively. Third temperature zones 60A and 60B are located within second temperature zones 58A and 58B, respectively and include temperatures (or temperature) that are greater than second temperature zones 58A and 58B, respectively.

As shown in FIG. 6B, channel manifold 62 is disposed in plate 40 such that channel manifold 62 is contained within interior 48 of plate 40. Channel manifold 62 is fluidly connected to a source of cooling liquid (e.g., water) in the engine. Nozzles 50, 50', and/or 50" (of FIGS. 3-5, not shown in FIG. 6A or 6B) are distributed across channel manifold and are fluidly connected at various locations along primary channel 64, secondary channels 66A, 66B, and 66C, tertiary channels 68A and 68B, and/or quaternary channels 70A and 70B.

Primary channel 64 is fluidly connected to secondary channels 66A, 66B, and 66C. As shown in FIG. 6B, primary channel 64 has a larger width (or diameter) than secondary channels 66A, 66B, and 66C. Secondary channels 66A, 66B, and 66C branch off from primary channel 64 and are fluidly connected to primary channel 64. Secondary channels 66A and 66B have larger widths (or diameters) than tertiary channels 68A and 68B, respectively. Tertiary channels 68A and 68B branch off from and are fluidly connected to secondary channels 66A and 66B, respectively. Tertiary channels 68A and 68B have larger widths (or diameters) than quaternary channels 70A and 70B, respectively. Quaternary channels 70A and 70B branch off from and are fluidly connected to tertiary channels 68A and 68B, respectively.

Channel manifold 62 transports cooling fluid flow $F_{CF}$ to each of hot spots 54A, 54B, and 54C. The relative size differentials of primary channel 64, secondary channels 66A, 66B, and 66C, tertiary channels 68A and 68B, and quaternary channels 70A and 70B provide different amounts of cooling fluid flow $F_{CF}$ to each of first temperature zones 56A, 56B, and 56C, second temperature zones 58A and 58B, and third temperature zones 60A and 60B of hot spots 54A, 54B, and 54C. By varying the amount of water (i.e., cooling fluid flow $F_{CF}$) delivered throughout plate 40 due to the varying sizes of primary channel 64, secondary channels 66A, 66B, and 66C, tertiary channels 68A and 68B, and quaternary channels 70A and 70B, such as to hot spots 54A, 54B, and 54C, channel manifold 62 locally optimizes the flow of water to different locations within heat exchanger 16 to maximize evaporative cooling at locations with higher temperatures.

Figure 7:
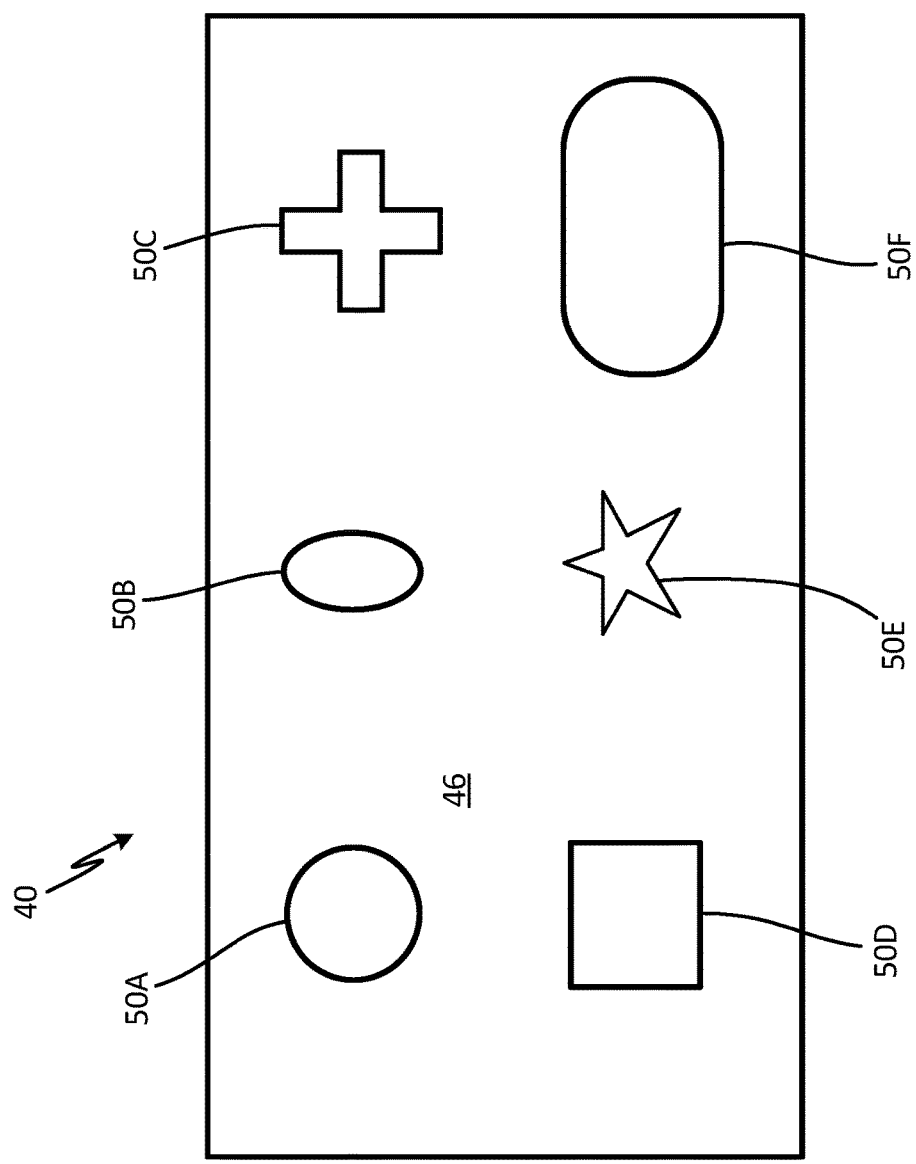
FIG. 7 is a top view of a surface of the heat exchanger with nozzles of various shapes.

FIG. 7 is a top view of external surface 46 of plate 40 with nozzles 50A, 50B, 50C, 50D, 50E, and 50F of various shapes. Nozzles 50A, 50B, 50C, 50D, 50E, and 50F are apertures or gaps configured for the transfer or ejection of a liquid. Nozzle 50A includes a circular shaped aperture. Nozzle 50B includes an oval shaped aperture. Nozzle 50C includes a cross shaped aperture. Nozzle 50D includes a square (or rectangular) shaped aperture. Nozzle 50E includes a star shaped aperture. Nozzle 50F includes a rounded rectangular shaped aperture. In another non-limiting embodiment, plate 40 can include numerous nozzles in close proximity to provide a showerhead configuration of nozzles. In another non-limiting embodiment, plate 40 can include greater than one hundred nozzles so that a small amount of cooling fluid is directed to the space in between each fin in each channel. Similar to the functionality of pores in human skin, the cooling fluid is "sweat" onto heat exchanger 16 in a mostly uniform pattern while also providing portions of heat exchanger 16 that are expected to be hotter-than-average with more nozzles or nozzles with a larger cross-sectional area. In another non-limiting embodiment, plate 40 can include greater than one thousand nozzles.

Nozzles 50A, 50B, 50C, 50D, 50E, and 50F are integrally disposed in plate 40 and extend through external surface 46 and interior 48. Nozzles 50A, 50B, 50C, 50D, 50E, and 50F are fluidly connected to any of channels 44, 44C, 44D, or channel manifold 62 of FIGS. 2-6B. Nozzles 50A, 50B, 50C, 50D, 50E, and 50F are configured to transport a liquid from one of channels 44, 44C, 44D, or channel manifold 62 of FIGS. 2-6B, through external surface 46 of plate 40, and distribute the liquid onto a portion of external surface 46 of plate 40.

The shapes of nozzles 50A, 50B, 50C, 50D, 50E, and 50F can be selected to adjust the amount and distribution pattern of the water onto plate 40 depending on the temperature distribution of plate 40 (see e.g., FIGS. 6A and 6B).

Figure 8:
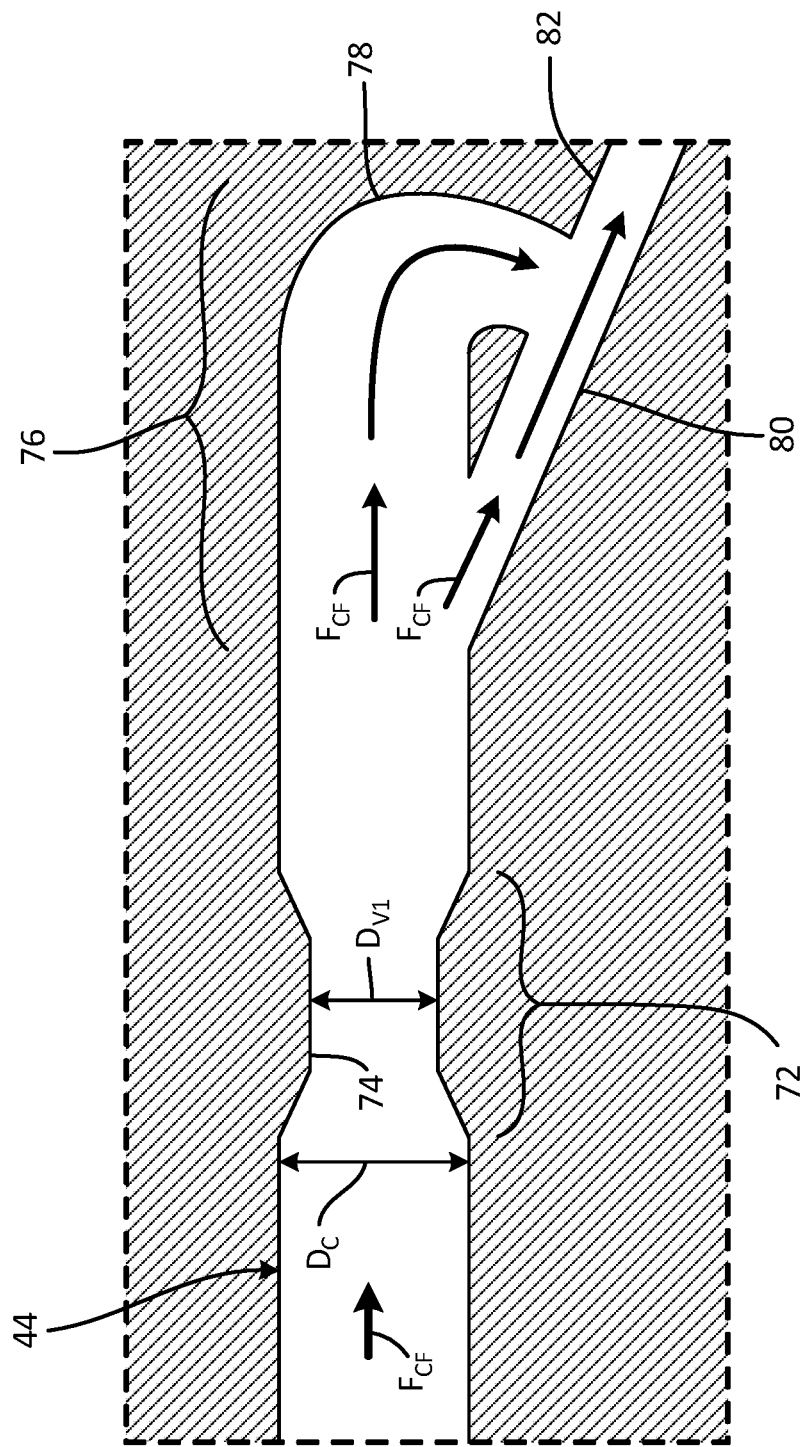
FIG. 8 is a cross-section view of a channel of the heat exchanger with two valves.

FIG. 8 is a cross-section view of channel 44 (with diameter $D_C$ and first valve 72 including restriction 74 with diameter $D_{V1}$), second valve 76 (with elbow 78, angled portion 80, and outlet 82), and cooling fluid flow $F_{CF}$. First valve 72 and second valve 76 are fixed-geometry passive valves. In another non-limiting embodiment, first valve 72 or second valve 76 can include at least one of a fixed-geometry passive check valve, a pulsating valve, and a bi-stable valve. Restriction 74 is an area of channel 44 that includes diameter $D_{V1}$ that is smaller than diameter $D_C$ of channel 44. Second valve 76 is a fixed-geometry passive check valve. Elbow 78 is a flow-control segment of second valve 76. Angled portion 80 is a secondary fluidic passageway of second valve 76. Outlet 82 is a fluidic passageway extending away from second valve 76.

First valve 72 is disposed in, or as a part of, channel 44 and is further disposed in interior 48 of plate 40. First valve 72 is fluidly connected to channel 44 and to second valve 76.

Restriction 74 is disposed in, or as a part of, channel 44 and is further disposed in interior 48 of plate 40. Second valve 76 is disposed in, or as a part of, channel 44 and is further disposed in interior 48 of plate 40. Second valve 76 is fluidly connected to channel 44 and to first valve 72. Elbow 78 is fluidly connected to channel 44, to angled portion 80, and to outlet 82. Angled portion 80 is fluidly connected to channel 44, elbow 78, and to outlet 82. Outlet 82 is formed in interior 48 of plate 40, and is fluidly connected to elbow 78 and to angled portion 80.

First valve 72 slows the rate of flow of cooling fluid flow $F_{CF}$ passing across first valve with restriction 74. Restriction 74 of first valve 72 forms a constriction region in first valve 72 that constricts the amount of flow of cooling fluid flow $F_{CF}$ that passes across first valve 72. As diameter $D_{V1}$ of constriction region reduces along an axial direction of channel 44, the cross-sectional area through which cooling fluid flow $F_{CF}$ travels through becomes smaller. As the cross-sectional area through which cooling fluid flow $F_{CF}$ travels through becomes smaller, a pressure of cooling fluid flow $F_{CF}$ increases. As cooling fluid flow $F_{CF}$ passes through and away from restriction 74 of first valve 72, a linear velocity of cooling fluid flow $F_{CF}$ is reduced in accordance with the Bernoulli Principle and the Venturi Effect due to an increase in cross-sectional area from $D_{V1}$ of restriction 74 to diameter $D_C$ of channel 44.

Second valve 76 slows an amount of cooling fluid flow $F_{CF}$ exiting from valve through outlet 82 by directing a first, larger portion of cooling fluid flow $F_{CF}$ into elbow 78 and a second, smaller portion of cooling fluid flow $F_{CF}$ into angled portion 80. The first, larger portion of cooling fluid flow $F_{CF}$ forced into elbow 78 is redirected by elbow 78 and joins into the flow of cooling fluid flow $F_{CF}$ passing through outlet 82 at an approximately perpendicular angle to the direction of the flow of cooling fluid flow $F_{CF}$ in outlet 82. The perpendicular re-joining, or intersection, of cooling fluid flow $F_{CF}$ from elbow 78 results in a pressure drop of cooling fluid flow $F_{CF}$ exiting from second valve 76 via outlet 82. A more detailed example of a fixed-geometry passive check valve can be found in U.S. Pat. No. 1,329,559.

First valve 72 and second valve 76 provide flow resistance and regulation of cooling fluid flow $F_{CF}$ capable of altering (e.g., reducing or increasing) an amount of cooling fluid flow $F_{CF}$ that reaches nozzle 50 (not shown) for ejection and impingement onto plate 40. This regulation of flow allows heat exchanger 16 to provide specific and precise amounts of water to specific areas along heat exchanger 16 so as to more effectively and efficiently manage cooling of heat exchanger 16.

Figure 9:
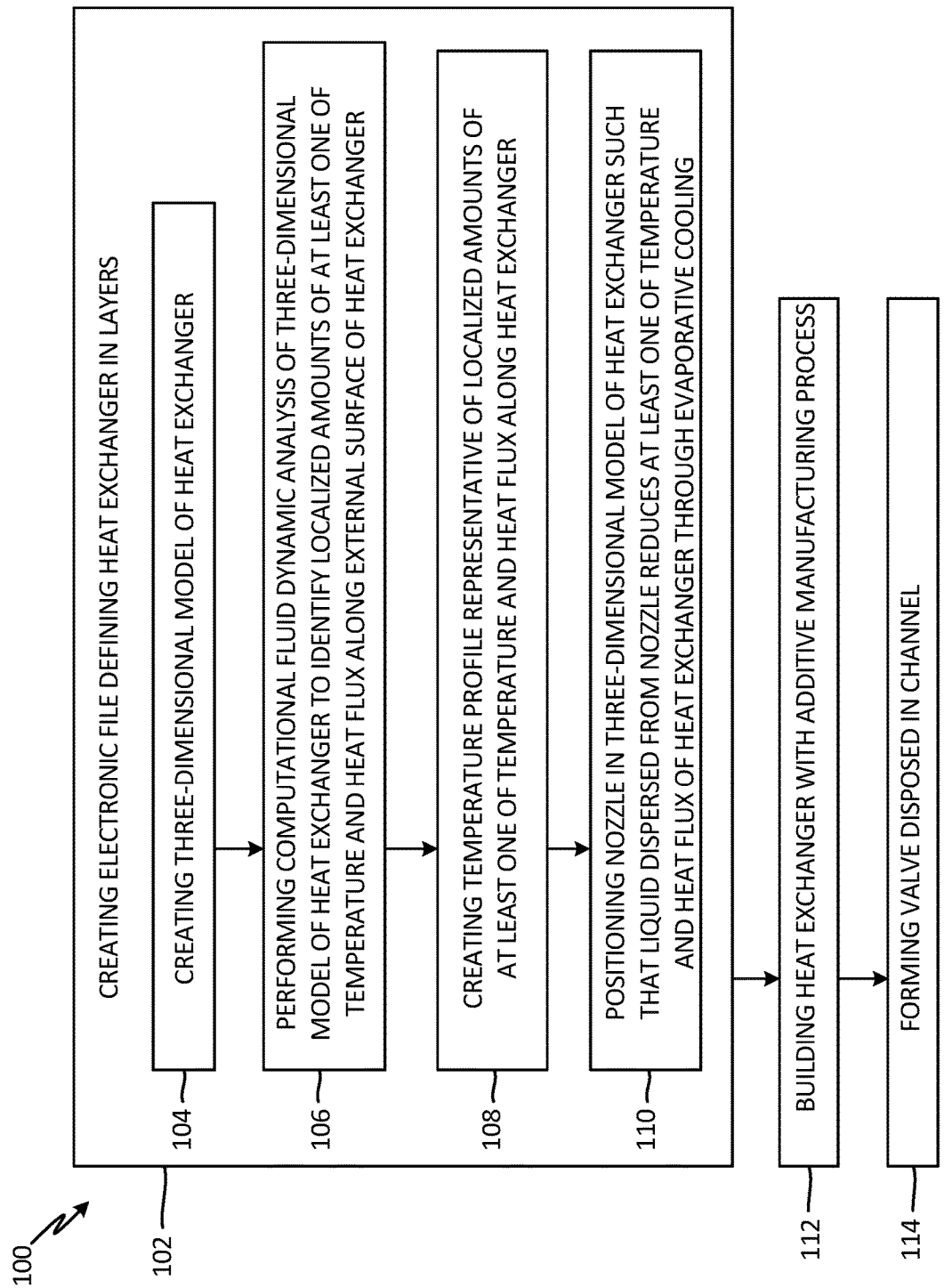
FIG. 9 is a flowchart of a method of manufacturing a heat exchanger.

FIG. 9 is a flowchart of method 100 of manufacturing heat exchanger 16. Method 100 includes steps 102-114. Step 102 includes a creating electronic file defining heat exchanger 16 in layers. Step 102 includes steps 104-110. Step 104 includes creating a three-dimensional model of heat exchanger 16. Step 106 includes performing a computational fluid dynamic analysis of the three-dimensional model of heat exchanger 16 to identify localized amounts of at least one of temperature and heat flux along external surface 46 of heat exchanger 16. Step 108 includes creating a temperature profile representative of the localized amounts of the at least one of temperature and heat flux along heat exchanger 16. Step 110 includes positioning nozzle 50 in the three-dimensional model of heat exchanger 16 such that liquid dispersed from nozzle 50 reduces at least one of temperature and heat flux of heat exchanger 16 through evaporative cooling. Step 112 includes building heat exchanger 16 with an additive manufacturing process such as direct metal laser sintering, selective metal laser sintering, injection molding, or stereolithography. Step 112 also includes step 114 that includes forming at least one of first valve 72 or second valve 76 disposed in channel 44. In another non-limiting embodiment, step 114 of forming at least one of first valve 72 or second valve 76 disposed in channel 44 can be performed with step 102, such as for example with step 110.

Figure 10:
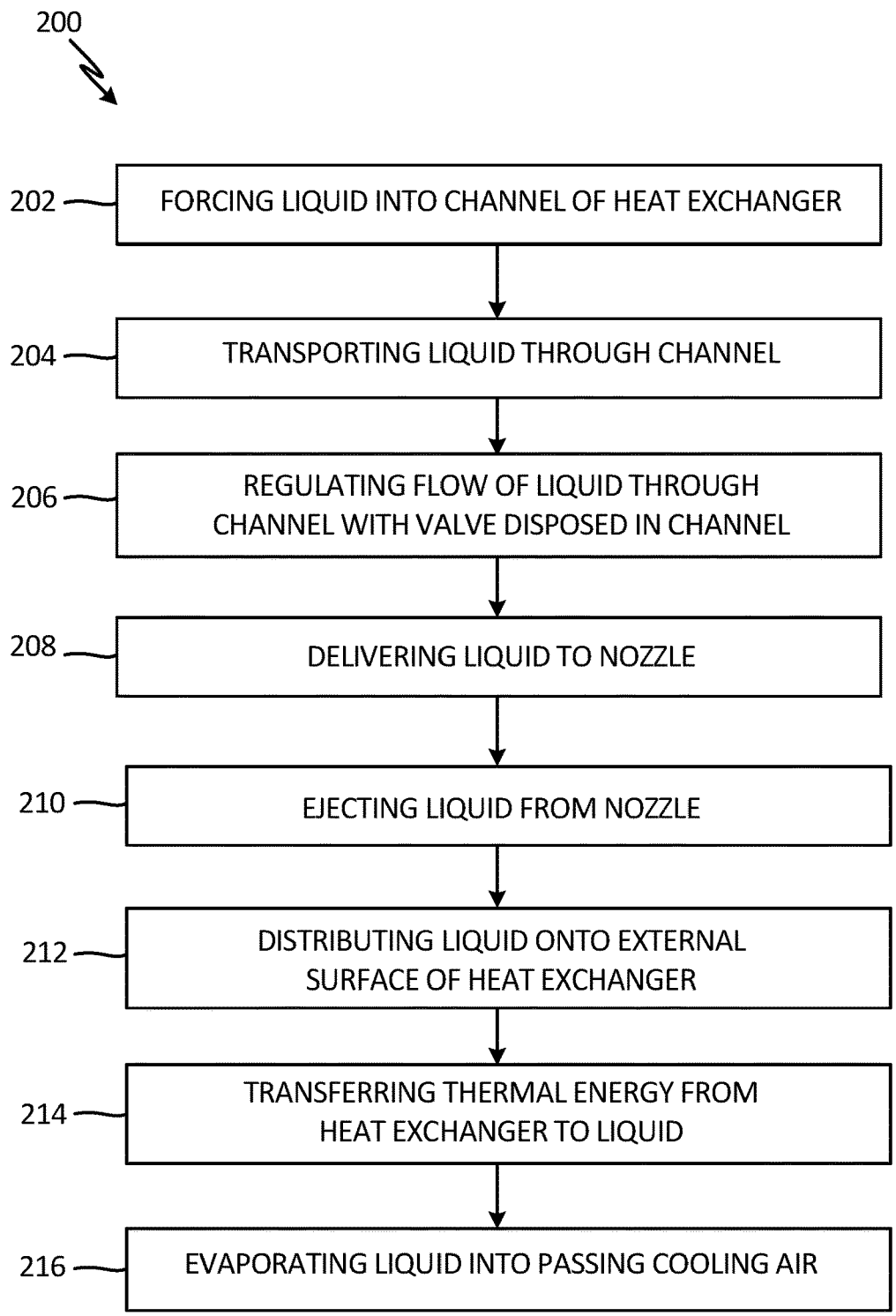
FIG. 10 is a flowchart of a method of evaporative cooling in an environmental control system.

FIG. 10 is a flowchart of method 200 of evaporative cooling in ECS 10. Method 200 includes steps 202-216. Step 202 includes forcing a cooling liquid into channel 44 of heat exchanger 16. Step 204 includes transporting the cooling liquid through channel 44. Step 206 includes regulating a flow of cooling liquid through channel 44 with at least one of first valve 72 or second valve 76 disposed in channel 44. Step 208 includes delivering the cooling liquid to nozzle 50. Step 210 includes ejecting the cooling liquid from nozzle 50. Step 212 includes distributing the cooling liquid onto external surface 46 of heat exchanger 16. Step 214 includes transferring thermal energy from heat exchanger 16 to the cooling liquid. Step 2016 includes evaporating the cooling liquid into passing cooling air.

Discussion of Possible Embodiments

The following are non-exclusive descriptions of possible embodiments of the present invention.

A heat exchanger includes a plate with an external surface, a channel, and a nozzle. The external surface bounds an interior of the plate. The channel is disposed in the heat exchanger and passes through a portion of the interior. The nozzle is integrally disposed in the heat exchanger, extends through a portion of the external surface, and is fluidly connected to the channel. The nozzle is configured to transport a liquid from the channel, through the external surface, and to distribute the liquid onto a portion of the heat exchanger.

The heat exchanger of the preceding paragraph can optionally include, additionally and/or alternatively, any one or more of the following features, configurations and/or additional components.

The heat exchanger can be designed for and/or built by a layer-by-layer additive manufacturing process.

The heat exchanger can be formed with an additive manufacturing process comprising direct metal laser sintering, selective metal laser sintering, injection molding, and/or stereolithography.

A valve can be disposed in the channel.

The valve can comprise a passive valve, and wherein the valve can be configured to control the flow rate of the liquid.

The valve can comprise at least one of a fixed-geometry passive check valve, a pulsating valve, and/or a bi-stable valve.

The channel can be fluidly connected to a source of cooling liquid in an engine.

The heat exchanger can be configured to connect to an environmental control system of an aircraft.

A material of the heat exchanger can comprise metal or polymer.

A channel manifold can comprise a plurality of channels that can extend through portions of the interior of the plate.

A plurality of nozzles can be fluidly connected to the channel manifold, wherein the plurality of nozzles can be distributed such that liquid dispersed from the plurality of nozzles can reduce at least one of a temperature and/or a heat flux of a portion of the heat exchanger through evaporative cooling.

A method of manufacturing includes creating an electronic file defining a heat exchanger in layers and building the heat exchanger with an additive manufacturing process in which the heat exchanger is built layer-by-layer by depositing powder and selectively solidifying the powder in accordance with the electronic file. The heat exchanger includes a plate with an external surface, a channel, and a nozzle. The external surface bounds an interior of the plate. The channel is disposed in the heat exchanger and passes through a portion of the interior. The nozzle is integrally disposed in the heat exchanger, extends through a portion of the external surface, and is fluidly connected to the channel. The nozzle is configured to transport a liquid from the channel, through the external surface, and to distribute the liquid onto a portion of the heat exchanger.

The method of the preceding paragraph can optionally include, additionally and/or alternatively, any one or more of the following features, configurations and/or additional components and/or steps.

A three-dimensional model of the heat exchanger can be created; a computational fluid dynamic analysis of the three-dimensional model of the heat exchanger can be performed to identify localized amounts of at least one of temperature and heat flux along the external surface of the heat exchanger; a temperature profile representative of the localized amounts of the at least one of temperature and heat flux along the heat exchanger can be created; and/or the nozzle can be positioned in the three-dimensional model the heat exchanger such that liquid dispersed from the nozzle can reduce at least one of a temperature and/or a heat flux of a portion of the heat exchanger through evaporative cooling.

A channel can comprise a channel manifold and the nozzle can comprise a plurality of nozzles, and the plurality of nozzles can be positioned in the three-dimensional model of the heat exchanger such that liquid dispersed from the plurality of nozzles can reduce at least one of a temperature and a heat flux of a portion of the heat exchanger through evaporative cooling.

A valve disposed in the channel can be formed, wherein the valve can be configured to regulate a flow of liquid through the channel.

A method of evaporative cooling in an environmental control system includes forcing a liquid into a channel disposed within a portion of a heat exchanger. The liquid is transported through the channel. The liquid is delivered to a nozzle that is integrally formed with and disposed in the heat exchanger and that is fluidly connected to the channel. The liquid is ejected from the nozzle and is distributed onto an external surface of the heat exchanger. The liquid is evaporated into passing cooling air.

The method of the preceding paragraph can optionally include, additionally and/or alternatively, any one or more of the following features, configurations and/or additional components and/or steps.

Thermal energy can be transferred from the heat exchanger to the liquid.

A flow of the liquid through the channel can be regulated with a valve disposed in the channel.

The valve can comprise a passive valve that can be configured to control the flow rate of the liquid.

The channel can comprise a channel manifold and the nozzle can comprise a plurality of nozzles, the liquid can be dispersed from the plurality of nozzles, and at least one of a temperature and/or a heat flux of a portion of the heat exchanger can be reduced through evaporative cooling.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of evaporative cooling in an environmental control system, the method comprising:
   forcing a liquid into a channel disposed within a portion of a heat exchanger, wherein the heat exchanger comprises:
      a plate with an external surface, wherein the external surface completely bounds an entirety of an interior of the plate;
      the channel disposed in the heat exchanger, wherein the channel passes through a portion of the interior of the plate; and
      a nozzle integrally disposed in the heat exchanger, wherein the nozzle extends through a portion of the external surface and is fluidly connected to the channel, wherein the nozzle is configured to transport a liquid from the channel, through the external surface, and to distribute the liquid onto a portion of the external surface of the heat exchanger;
   transporting the liquid through the channel;
   delivering the liquid to the nozzle;
   ejecting the liquid from the nozzle;
   distributing the liquid ejected from the nozzle onto the external surface of the heat exchanger; and
   evaporating the liquid into passing cooling air.

2. The method of claim 1, further comprising transferring thermal energy from the heat exchanger to the liquid.

3. The method of claim 1, further comprising regulating a flow of the liquid through the channel with a valve disposed in the channel.

4. The method of claim 3, wherein the valve comprises a passive valve configured to control a flow rate of the liquid.

5. The method of claim 1, wherein the channel comprises a channel manifold and the nozzle comprises a plurality of nozzles, and further comprising:
   dispersing the liquid from the plurality of nozzles; and
   reducing at least one of a temperature and a heat flux of a portion of the heat exchanger through evaporative cooling.

* * * * *